US010723457B2

(12) United States Patent
Tillotson et al.

(10) Patent No.: US 10,723,457 B2
(45) Date of Patent: Jul. 28, 2020

(54) SYSTEMS AND METHOD FOR POWERING AN ELECTRIC AERIAL VEHICLE

(71) Applicant: The Boeing Company, Chicago, IL (US)

(72) Inventors: Brian Tillotson, Seattle, WA (US); Charles B. Spinelli, Anthem, AZ (US)

(73) Assignee: The Boeing Company, Chicago, IL (US)

(*) Notice: Subject to any disclaimer, the term of this patent is extended or adjusted under 35 U.S.C. 154(b) by 251 days.

(21) Appl. No.: 15/821,778

(22) Filed: Nov. 23, 2017

(65) Prior Publication Data

US 2019/0152605 A1 May 23, 2019

(51) Int. Cl.
| | | |
|---|---|---|
| *B64D 5/00* | (2006.01) | |
| *B64D 27/24* | (2006.01) | |
| *B64C 39/02* | (2006.01) | |
| *G05D 1/10* | (2006.01) | |

(52) U.S. Cl.
CPC .............. *B64D 5/00* (2013.01); *B64C 39/024* (2013.01); *B64D 27/24* (2013.01); *G05D 1/101* (2013.01); *B64C 2201/042* (2013.01); *B64C 2201/066* (2013.01); *B64C 2201/082* (2013.01); *B64C 2201/104* (2013.01); *B64C 2201/12* (2013.01); *B64C 2201/145* (2013.01)

(58) Field of Classification Search
CPC ........ B64D 5/00; B64D 27/24; B64C 39/024; B64C 2201/042; B64C 2201/082; B64C 2201/104; B64C 2201/145; G05D 1/101
USPC .......................................................... 701/16
See application file for complete search history.

(56) References Cited

U.S. PATENT DOCUMENTS

| 2,516,150 A | 8/1945 | Samiran |
| 7,147,188 B2 | 12/2006 | Jakubowski, Jr. et al. |
| 7,568,660 B2 | 8/2009 | Howe |
| 7,610,841 B2 | 11/2009 | Padan |
| 9,021,932 B2 | 5/2015 | Tobias et al. |

(Continued)

FOREIGN PATENT DOCUMENTS

| DE | 10 2014 219 284 | 4/2016 |
| EP | 3 006 334 | 4/2016 |

OTHER PUBLICATIONS

Co-pending U.S. Appl. No. 15/821,776, filed Nov. 23, 2017.
Extended European Search Report prepared by the European Patent Office in application No. 18207480.7 dated Apr. 3, 2019.

*Primary Examiner* — Paula L Schneider
(74) *Attorney, Agent, or Firm* — McDonnell Boehnen Hulbert & Berghoff LLP

(57) ABSTRACT

In an example, a power source for an electric propulsion system of an aerial vehicle includes a body having an electrical energy storage device configured to store electrical energy. The power source also includes a plurality of terminals coupled to the electrical energy storage device for supplying the electrical energy from the electrical energy storage device to the electric propulsion system of the aerial vehicle. The power source further includes a plurality of flight control surfaces extending outwardly from the body. The flight control surfaces are actuatable to adjust a flight attitude of the power source. Additionally, the power source includes a flight control system including a processor and configured to actuate the plurality of flight control surfaces to fly the power source to a target location when the power source is jettisoned from the aerial vehicle.

20 Claims, 7 Drawing Sheets

(56) References Cited

U.S. PATENT DOCUMENTS

| | | | | |
|---|---|---|---|---|
| 2009/0205845 A1* | 8/2009 | Hoffman | ................ | A62C 3/025 |
| | | | | 169/43 |
| 2016/0107750 A1* | 4/2016 | Yates | .................... | B64C 39/024 |
| | | | | 244/2 |
| 2016/0288918 A1* | 10/2016 | Yates | ..................... | B64D 39/00 |

* cited by examiner

SYSTEMS AND METHOD FOR POWERING AN ELECTRIC AERIAL VEHICLE

FIELD

The present disclosure generally relates to systems and methods for supplying power to a vehicle, and more particularly to systems and methods for a power source, which can be jettisoned after supplying electrical power to an electric aerial vehicle.

BACKGROUND

An electric aerial vehicle is an aircraft that is powered by an electric propulsion system. Typically, an electric aerial vehicle includes an energy storage device, which stores electrical energy prior to take-off. The energy storage device then supplies the stored electrical energy to the electric propulsion system, which uses the electrical energy to generate thrust for flying the electric aerial vehicle.

SUMMARY

In an example, a power source for an electric propulsion system of an aerial vehicle includes a body having an electrical energy storage device configured to store electrical energy. The power source also includes a plurality of terminals coupled to the electrical energy storage device for supplying the electrical energy from the electrical energy storage device to the electric propulsion system of the aerial vehicle. The power source further includes a plurality of flight control surfaces extending outwardly from the body. The flight control surfaces are actuatable to adjust a flight attitude of the power source. Additionally, the power source includes a flight control system including a processor and configured to actuate the plurality of flight control surfaces to fly the power source to a target location when the power source is jettisoned from the aerial vehicle.

In another example, a method includes supplying electrical energy from a power source to an electric propulsion system of an aerial vehicle. After supplying the electrical energy, the method includes determining that the power source has been jettisoned from the aerial vehicle. Responsive to determining that the power source has been jettisoned, the method includes actuating a plurality of flight control surfaces of the power source to fly the power source to a target location. The method also includes landing the power source at the target location.

In another example, a method includes receiving, by an electric propulsion system of an aerial vehicle, electrical energy from a power source releasably coupled to the aerial vehicle, and generating, by the electric propulsion system using the electrical energy received from the power source, thrust to fly the aerial vehicle. After generating the thrust using the electrical energy received from the power source, the method includes jettisoning the power source from the aerial vehicle while flying the aerial vehicle.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
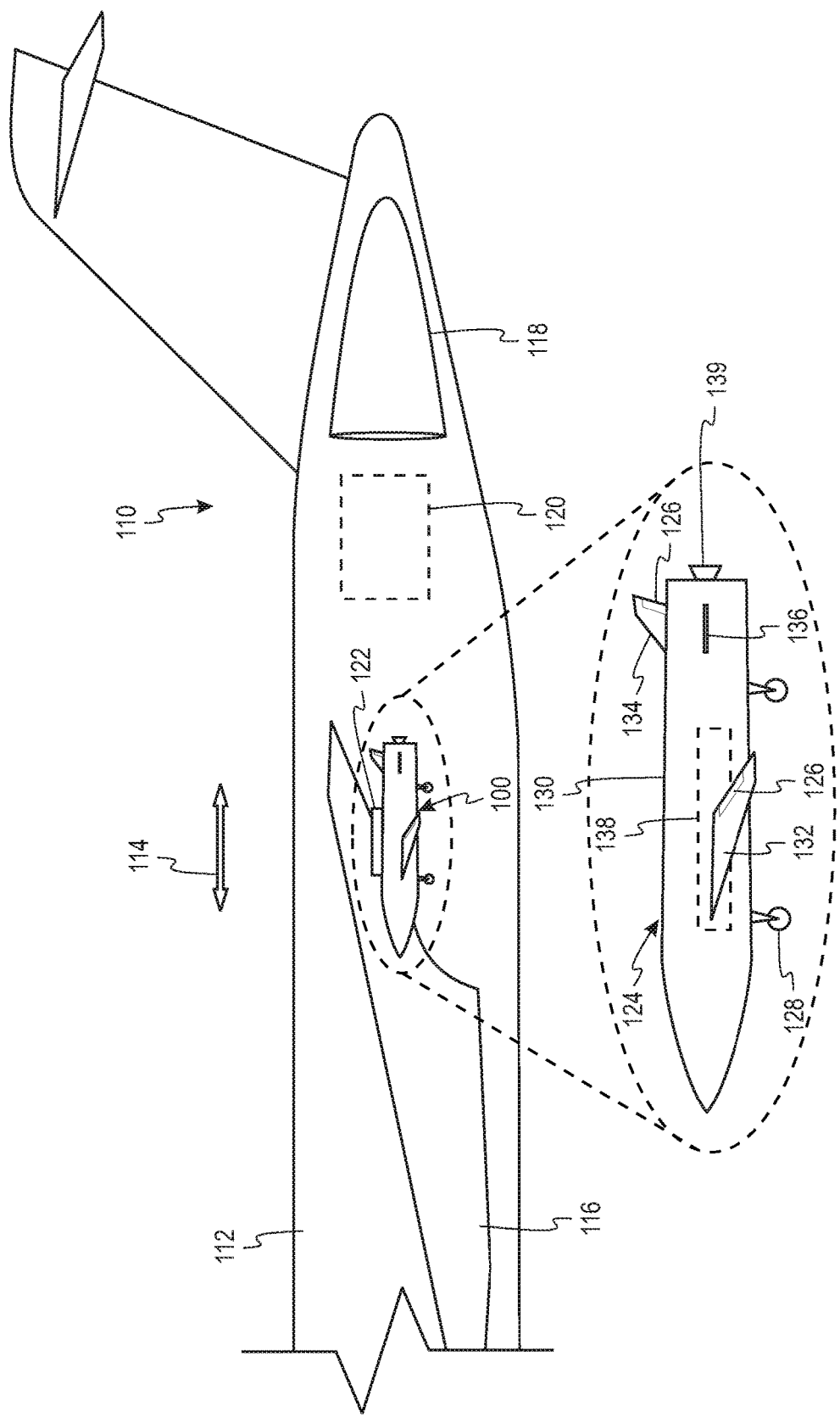
FIG. 1 illustrates a partial side view of a power source releasably coupled to an aerial vehicle, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

The systems and methods of the present disclosure provide systems and methods for supplying electrical power to an aerial vehicle. As noted above, the aerial vehicle can include an energy storage device for storing and supplying electrical energy to an electric propulsion system. In general, a range and/or duration of flight for the aerial vehicle may be limited by the gravimetric and volumetric energy density of the energy storage devices carried by the aerial vehicle.

Increasing the energy storage capacity of the aerial vehicle can allow the aerial vehicle to fly for greater distance and/or longer durations. For instance, the aerial vehicle can include a larger energy storage device and/or a greater quantity of energy storage devices to increase the energy storage capacity. However, providing the aerial vehicle with larger and/or more energy storage device(s) comes at the expense of increased weight and/or drag on the aerial vehicle. Typically, the aerial vehicle incurs these penalties for the entire duration of a flight.

Example systems and methods described herein can beneficially address at least some drawbacks of existing power sources for aerial vehicles having an electric propulsion system. Within the example described herein, a power source is releasably coupled to an aerial vehicle. The power source includes a body having an energy storage device for storing electrical energy and a plurality of terminals coupled to the energy storage device for supplying the electrical energy from the energy storage device to an electric propulsion system of the aerial vehicle. After supplying the electrical energy to propulsion system during a first portion of a flight, the aerial vehicle can jettison the power source and continue to fly during a second portion of the flight (e.g., using electrical energy stored in another energy storage device of the aerial vehicle). Jettisoning the power source mid-flight reduces the weight and drag on the aerial vehicle, which increases the energy efficiency and extends the flight range of the aerial vehicle during the second portion of the flight.

In some examples, the power source includes a plurality of flight control surfaces extending outwardly from the body. The flight control surfaces are actuatable to adjust a flight attitude of the power source. The power source further includes a flight control system including a processor. The flight control system can actuate the flight control surfaces to fly the power source to a target location when the power source is jettisoned from the aerial vehicle. The target location can be a designated location for landing the power source such as, for example, an airport, a runway, a helipad, a rocket launch pad, and/or an area at which public access is restricted.

By controllably flying the power source from the aerial vehicle to the target location, the power source can be recovered and re-used for future flights. Additionally, for example, controllably flying the power source from the aerial vehicle to the target location can provide flexibility in positioning the aerial vehicle when the aerial vehicle jettisons the power source. For instance, when the power source includes the flight control surfaces, the power source can navigate over a greater range with more precise control than power sources lacking flight control surfaces. This allows the aerial vehicle to jettison the power source at relatively greater distances from the target location than can be achieved by power sources lacking flight control surfaces. This also provides for greater flexibility in selecting a location and/or time at which to jettison the power source.

Also, within examples, the power source can include a landing system. The landing system can reduce (or minimize) damage to the power source when the power source lands at the target location. By providing the power source with the landing system, the re-usability of the power source can be increased and the cost of operating the aerial vehicle with the power source can be reduced relative to power sources that omit the landing system.

Referring now to FIG. 1, a partial perspective view of a power source 100 releasably coupled to an aerial vehicle 110 is depicted according to an example embodiment. In FIG. 1, the aerial vehicle 110 is a fixed-wing aircraft. As such, in FIG. 1, the aerial vehicle 110 includes a fuselage 112 that extends in a longitudinal direction 114, and a wing 116 that extends from the fuselage 112 in a transverse direction relative to the longitudinal direction 114. Although the aerial vehicle 110 is depicted as a fixed-wing aircraft in FIG. 1, the aerial vehicle 110 can be a helicopter, a lighter-than-air vehicle, and/or a spacecraft in other examples. More generally, the aerial vehicle 110 can be any vehicle that can travel by air.

As shown in FIG. 1, the aerial vehicle 110 includes an electric propulsion system 118 and one or more power stores 120. As examples, the electric propulsion system 118 can include one or more electrically powered engines, turbines, propellers, and/or rotors. The power store(s) 120 can store electrical energy for powering the electric propulsion system 118. Also, as examples, the power store(s) 120 can include one or more batteries, supercapacitors, and/or fuel cells that can store and supply electrical energy to the electric propulsion system 118. The propulsion system 118 can thus use the electrical energy supplied by the power store(s) 120 to generate thrust for moving the aerial vehicle 110 through the air.

The power source 100 is releasably coupled to a station (e.g., a hardpoint) of the aerial vehicle 110 by a releasable coupler 122. The releasable coupler 122 can include a pylon, a launcher, a rack, an ejector rack, and/or a launcher rack for coupling the power source 100 to the aerial vehicle 110 during a first phase of flight and jettisoning the power source 100 from the aerial vehicle 110 during a second phase of flight. In some implementations, the releasable coupler 122 can passively jettison the power source 100 (i.e., by gravity alone). In other implementations, the releasable coupler 122 can actively jettison the power source 100, for instance, by applying an ejection force to the power source 100 to assist separation of the power source 100 from the aerial vehicle 110 (e.g., by applying a spring force to the power source 100).

In one example, the releasable coupler 122 can include, at the station of the aerial vehicle 110, a rack for releasably coupling to a plurality of lugs on the power source 100. In additional or alternative examples, the releasable coupler 122 can include one or more pyrotechnic charges, pneumatic devices, movable hooks, separation nuts, frangible nuts, separation bolts, bolt cutters, wire cutters, cable cutters, split spool devices (e.g., fusible wires and/or shaped-memory alloy wires), solenoid actuated nuts, marman bands, pin pushers, and/or pin pullers. The type of releasable coupler 122 used to releasably couple the power source 100 and the aerial vehicle 110 can be determined based on one or more factors including, for example, susceptibility to electromagnetic interference, release response time, release shock, capability to withstand launch loads, capability to sustain preloads, power input to actuate, weight, size, temperature sensitivity, and/or release reliability.

In some examples, the station is located on an exterior surface of the aerial vehicle 110. For instance, in FIG. 1, the station is on the wing 116 of the aerial vehicle 110. The station can additionally or alternatively be on an exterior surface of the fuselage 112 (e.g., an underside of the fuselage 112). Although FIG. 1 depicts a single power source 100 on the wing 116, the aerial vehicle 110 can include one or more power sources 100 on the wing 116, another wing on an opposite side of the fuselage 112, and/or the fuselage 112.

In other examples, station can be additionally or alternatively located in the fuselage 112 or the wing 116 of the aerial vehicle 110. For instance, the aerial vehicle 110 can include one or more power sources 100 in a cargo bay of the fuselage 112. In such examples, the aerial vehicle 110 can include one or more access doors, which can open during flight of the aerial vehicle 110 to facilitate jettisoning the power source 100.

As shown in FIG. 1, the power source 100 includes a body 124, a plurality of flight control surfaces 126, and a landing system 128. In FIG. 1, the body 124 is in the form of a fixed-wing aircraft. Specifically, the body 124 includes a fuselage 130 and a pair of wings 132. Additionally, the body 124 includes a vertical stabilizer 134 and a pair of horizontal stabilizers 136 extending from opposing sides of the body 124.

Although the body 124 is in the form of a fixed-wing aircraft in FIG. 1, the body 124 can take other forms in other examples. For instance, in some examples, the body 124 can have an aerodynamic shape, which can facilitate flying the power source 100 from the aerial vehicle 110 to the target location. In additional or alternative examples, the body 124 can have a conformal shape relative to a shape of the aerial vehicle 110, and/or the body 124 can have a non-conformal shape relative to the shape of the aerial vehicle 110. Additionally, for example, the body 124 can include one or more canards and/or an empennage in other examples.

The flight control surfaces 126 extend outwardly from the body 124. For example, in FIG. 1, the flight control surfaces 126 extend from the wings 132 and the vertical stabilizer 134 of the power source 100. The flight control surfaces 126 are actuatable to adjust a flight attitude of the power source 100. As examples, the flight control surfaces 126 can include an elevator, a rudder, an aileron, a flap, a spoiler, a leading edge flap, a leading edge slat, a trim tab, a wing, a horizontal stabilizer, a vertical stabilizer, a rotor (e.g., with a controllable pitch), and/or a parafoil. Also, within examples, the flight control surfaces 126 are actuatable to adjust the pitch, roll, and/or yaw of the power source 100 while the power source 100 is in flight.

The landing system 128 can reduce (or minimize) damage to the power source 100 when the power source 100 lands at the target location. Within examples, the landing system 128 can facilitate landing the power source 100 on a ground surface, water, snow, and/or an aircraft carrier. In such examples, the landing system 128 can include, for instance, one or more wheels, skis, pontoons, and/or parachutes. In another example, the landing system 128 can include one or more arrestor hooks that can engage with a net and/or a cable at the target location to arrest the power source 100. In another example, the landing system 128 can include one or more rotors, which can provide for an autorotation mode of flight to decrease or limit a rate of descent of the power source 100 during landing.

By providing the power source 100 with the landing system 128, the re-usability of the power source 100 can be increased and the cost of operating the aerial vehicle 110 with the power source 100 can be reduced relative to power sources that omit the landing system 128. Despite these benefits, the power source 100 can omit the landing system 128 in other examples.

In FIG. 1, the wings 132, the vertical stabilizer 134, the horizontal stabilizers 136, the flight control surfaces 126, and the landing system 128 extend from the body 124. In some examples, one or more of these components can be configured to (i) retract within the body 124 prior to the aerial vehicle 110 jettisoning the power source 100, and then (ii) deploy to extend from the body 124 after the aerial vehicle 110 jettisons the power source 100. This may facilitate reducing drag and increasing operational efficiency prior to aerial vehicle 110 jettisoning the power source 100.

The body 124 has an energy storage device 138 that can store additional electrical energy for powering the electric propulsion system 118 of the aerial vehicle 110. In one example, the body 124 can include one or more internal surfaces, which define an enclosed space for storing the electrical energy.

As shown in FIG. 1, the power source 100 can also include a propulsion system 139, which is operable to generate thrust for flying the power source 100 after the power source 100 is jettisoned from the aerial vehicle 110. For instance, in some implementations, the power source 100 can be jettisoned with a residual portion of electrical energy remaining in the energy storage device 138. The propulsion system 139 can use the residual portion of electrical energy in the energy storage device 138 to generate thrust to assist in flying the power source 100 to the target location. As examples, the propulsion system 139 can include one or more engines, turbines, propellers, and/or rotors.

Although FIG. 1 depicts the power source 100 having the propulsion system 139, the power source 100 can omit the propulsion system 139 in other examples. For instance, in other examples, the power source 100 can fly and/or glide to the target location without the assistance of thrust generated by the propulsion system 139. Additionally, within examples, the power source 100 can be jettisoned with a residual portion of electrical energy remaining in the energy storage device 138 or no electrical energy remaining in the energy storage device 138 (i.e., after the energy storage device 138 supplies all electrical energy to the electric propulsion system 118 of the aerial vehicle 110).

Figure 2:
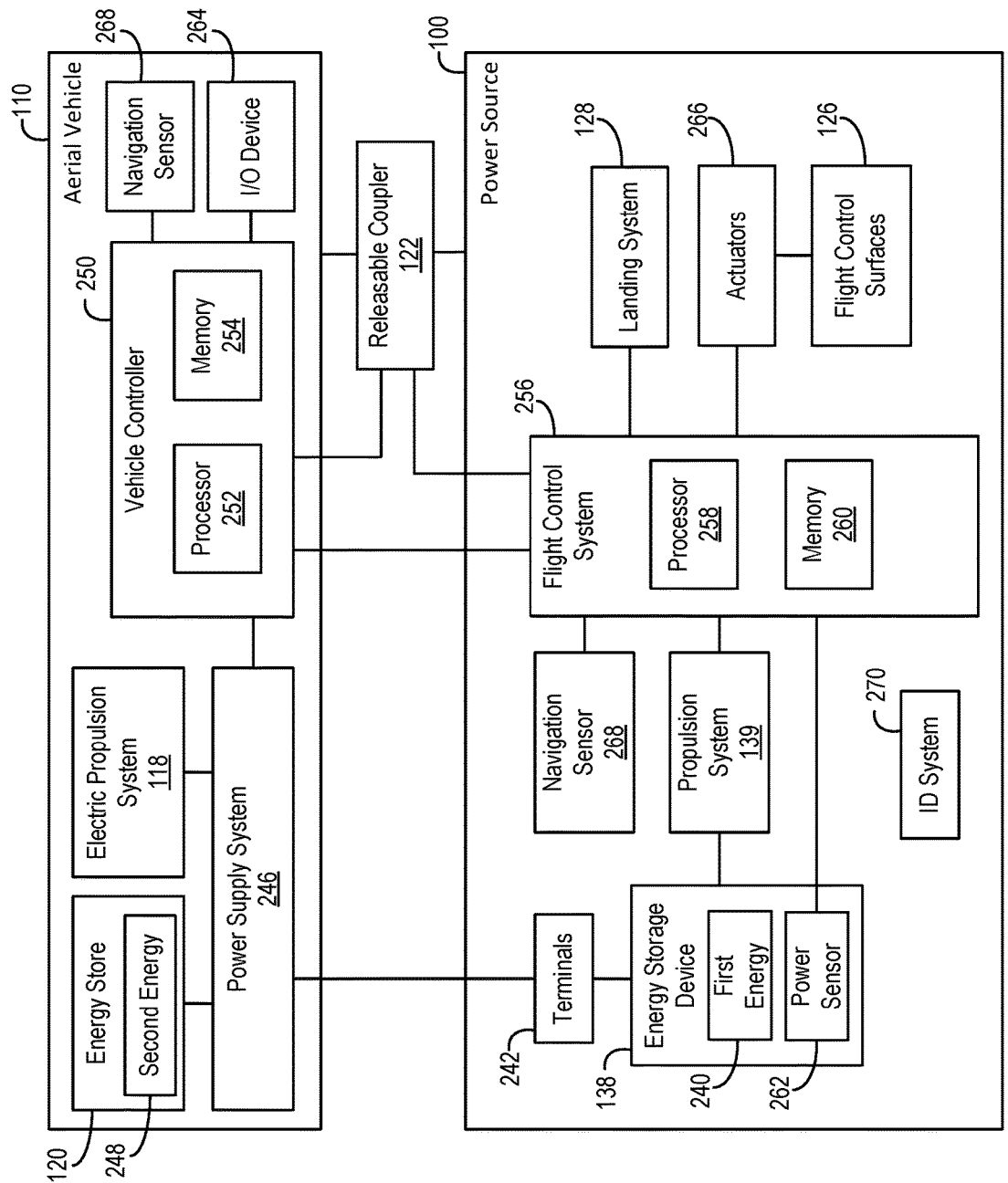
FIG. 2 illustrates a simplified block diagram of the power source and the aerial vehicle illustrated in FIG. 1.

FIG. 2 depicts a simplified block diagram including additional components of the power source 100 and the aerial vehicle 110 according to an example embodiment. As shown in FIG. 2, the power source 100 includes the energy storage device 138, which stores a first electrical energy 240 for powering the electric propulsion system 118 of the aerial vehicle 110.

Within examples, the power source 100 includes a plurality of terminals 242 coupled to the energy storage device 138 for supplying the first electrical energy 240 from the energy storage device 138 to the electric propulsion system 118 of the aerial vehicle 110. For instance, in an example in which the energy storage device 138 is a battery, the terminals 242 can include a first terminal coupled to the anode of the battery and a second terminal coupled to the cathode of the battery.

As shown in FIG. 2, the terminals 242 are coupled to the electric propulsion system 118 by a power supply system 246 of the aerial vehicle 110. The power supply system 246 can include one or more switches, relays, transistors, and/or conductors (e.g., wires) for controlling the flow of the first electrical energy 240 from the energy storage device 138 to the electric propulsion system 118.

Additionally, for example, the terminals 242 can facilitate charging the energy storage device 138 with the first electrical energy 240 prior to the aerial vehicle 110 departing from a departure location (i.e., prior to take-off). For instance, the terminals 242 can provide electrical contacts for coupling the energy storage device 138 with an external power source at a recharging location. As an example, the external power source can include a power utility (e.g., via the electric grid), a wind power system, a hydro-electric power generation system, and/or a solar power generation system at a recharging location.

As shown in FIG. 2, the power supply system 246 can also couple the electric propulsion system 118 to the power store(s) 120 of the aerial vehicle 110. The power store(s) 120 can store a second electrical energy 248 for powering the electric propulsion system 118. Within examples, the power supply system 246 can further provide for controlling the flow of the second electrical energy 248 from the power store(s) 120 to the electric propulsion system 118.

As shown in FIG. 2, the power supply system 246 is in communication with a vehicle controller 250 of the aerial vehicle 110. In general, the vehicle controller 250 is a computing device that is configured to control operation of the power supply system 246, and/or provide other functions described further below. For example, the vehicle controller 250 can provide one or more control signals to the power supply system 246 to start, stop, and/or modify a rate of electrical energy flow from the energy storage device 138 and/or the power store(s) 120 to the electric propulsion system 118.

The vehicle controller 250 can be implemented using hardware, software, and/or firmware. For example, the vehicle controller 250 can include one or more processors 252 and a non-transitory computer readable medium (e.g., volatile and/or non-volatile memory 254) that stores machine language instructions or other executable instructions. The instructions, when executed by the one or more processors, cause the aerial vehicle 110 to carry out the various operations described herein. The vehicle controller 250, thus, can receive data and store the data in the memory 254 as well.

As described above with respect to FIG. 1, the power source 100 is releasably coupled to the aerial vehicle 110 by the releasable coupler 122. Although FIG. 2 depicts the releasable coupler 122 as separate from the aerial vehicle 110 and the power source 100, (i) the aerial vehicle 110 can include the releasable coupler 122, (ii) the power source 100 can include the releasable coupler 122, or (iii) the aerial vehicle 110 and the power source 100 can each include a respective portion of the releasable coupler 122 within examples of the present disclosure. In general, the releasable coupler 122 is actuatable to provide a mechanical release of the power source 100 coupled to the aerial vehicle 110 by the releasable coupler 122. For example, the releasable coupler 122 can couple the power source 100 to the aerial vehicle 110 in a first state and release the power source 100 from the aerial vehicle 110 in a second state.

In one example, the releasable coupler 122 can include one or more contacts for electrically coupled to the power supply system 246, and the terminals 242 can include one or more flanges. When the releasable coupler 122 is in the first state, the clamps can couple to the flanges to mechanically couple the power source 100 to the aerial vehicle 110 and electrically couple the energy storage device 138 to the power supply system 246. When the releasable coupler is actuated from the first state to the second state, the clamps of the releasable coupler 122 can release from the flanges of the terminals 242 to jettison the power source 100 from the aerial vehicle 110. In another example, the releasable coupler 122 can include the flanges and the terminals 242 can include the clamps. Other examples are also possible.

In some examples, the releasable coupler 122 can be in communication with the vehicle controller 250. In this arrangement, the vehicle controller 250 can selectively actuate the releasable coupler 122 to jettison the power source 100. For instance, the vehicle controller 250 can transmit one or more trigger signals to the releasable coupler 122 (e.g., via wired or wireless communication) and, responsive to the trigger signal(s), the releasable coupler 122 can actuate from the first state to the second state to jettison the power source 100.

In other examples, the releasable coupler 122 can be additionally or alternatively in communication with a flight control system 256 of the power source 100. The flight control system 256 is a computing device that can control operation of the power source 100. As described in further detail below, the flight control system 256 can actuate the flight control surfaces 126 to fly the power source 100 to the target location when the power source 100 jettisoned from the aerial vehicle 110. Additionally, in implementations in which the flight control system 256 is in communication with the releasable coupler 122, the flight control system 256 can transmit the trigger signal(s) to the releasable coupler 122 (via wired and/or wireless communication) and, responsive to the trigger signal(s), the releasable coupler 122 can actuate from the first state to the second state to jettison the power source 100 from the aerial vehicle 110.

Similar to the vehicle controller 250, the flight control system 256 can be implemented using hardware, software, and/or firmware. For example, the flight control system 256 can include one or more processors 258 and a non-transitory computer readable medium (e.g., volatile and/or non-volatile memory 260) that stores machine language instructions or other executable instructions. The instructions, when executed by the one or more processors, cause the power source 100 to carry out the various operations described herein. The flight control system 256, thus, can receive data and store the data in the memory 260 as well.

As shown in FIG. 2, the flight control system 256 can be additionally or alternatively in communication with the vehicle controller 250. In this arrangement, the flight control system 256 can cause the vehicle controller 250 to actuate the releasable coupler 122, and/or the vehicle controller 250 can cause the flight control system 256 to actuate the releasable coupler 122 in additional or alternative examples. Also, communicatively coupling the flight control system 256 and the vehicle controller 250 can provide for distributed processing to increase the robustness and performance of the operations of the aerial vehicle 110 and/or the power source 100 described herein.

Within examples, the vehicle controller 250 and/or the flight control system 256 can determine an aerial drop location at which the aerial vehicle 110 can jettison the power source 100 (e.g., by actuating the releasable coupler 122). In some examples, the vehicle controller 250 and/or the flight control system 256 can determine the aerial drop location based on the target location. For instance, the vehicle controller 250 and/or the flight control system 256 can determine the aerial drop location to be a location that is within a threshold distance of the target location, where the threshold distance is related to a maximum distance of flight for the power source 100. In this way, the vehicle controller 250 and/or the flight control system 256 can determine the aerial drop location such that the power source 100 will be capable of flying to the target location when jettisoned from the aerial vehicle 110 (i.e., the aerial vehicle 110 can jettison the power source 100 within a reachable distance of the target location).

The maximum distance of flight for the power source 100 can be based on various factors such as, for instance, (i) an altitude of the power source 100, (ii) a glide ratio of the power source 100, (iii) a distance from the aerial drop location to the target location, (iv) wind conditions (e.g., speed and/or direction) between the aerial drop location and the target location, and/or (v) an amount of the first electrical energy 240 remaining in the energy storage device 138. Thus, in some examples, the vehicle controller 250 and/or the flight control system 256 can determine the aerial drop location based on one or more of these factors.

In some examples, the vehicle controller 250 and/or the flight control system 256 can determine the aerial drop location and/or the target location prior to take-off of the aerial vehicle 110. For instance, the vehicle controller 250 and/or the flight control system 256 can store flight plan data relating to, for example, a departure location from which the aerial vehicle 110 will take-off, a destination location at which the aerial vehicle 110 will land, and/or a flight path between the departure location and the destination location. Based on the flight plan data, the vehicle controller 250 and/or the flight control system 256 can determine the aerial drop location and/or the target location.

In other examples, the vehicle controller 250 and/or the flight control system 256 can determine the aerial drop location after take-off of the aerial vehicle 110. For instance, in one implementation, the vehicle controller 250 and/or the flight control system 256 can determine the aerial drop location and/or the target location after determining that less than a threshold amount of the first electrical energy 240 remains in the power source 100. The threshold amount can be all of the first electrical energy 240 in the energy storage device 138 (i.e., when no electrical energy remains in the energy storage device 138). Alternatively, the threshold amount can relate to a residual portion of electrical energy for powering the propulsion system 139 of the power source 100 to fly the power source 100 from the aerial drop location to the target location.

To determine that less than the threshold amount of electrical energy remains in the power source 100, the power source 100 can include an power sensor 262. As shown in FIG. 2, the power sensor 262 is operatively coupled to the energy storage device 138 and in communication with the flight control system 256. The power sensor 262 can sense an amount of the first electrical energy 240 in the energy storage device 138 and provide to the flight control system 256 an energy-level signal indicative of the determined amount of the first electrical energy 240. Responsive to the energy-level signal, the flight control system 256 can compare the determined amount of first electrical energy 240 to the threshold amount of electrical energy to determine when less than the threshold amount of electrical energy remains in the power source 100. As an example, the power sensor 262 can include a voltmeter that can measure the amount of power stored in the energy storage device 138.

After determining that less than the threshold amount of electrical energy remains in the power source 100, the vehicle controller 250 and/or the flight control system 256 can select the target location from among a plurality of candidate locations. The plurality of candidate locations can be predetermined locations having facilities, personnel, and/or equipment for landing, recovering, and/or recharging the power source 100 (e.g., locations determined prior to take-off on the flight). In an example, the vehicle controller 250 and/or the flight control system 256 select the target location based on at least one of an altitude of the power source 100, a glide ratio of the power source 100, and/or a distance from the power source 100 to the target location. After selecting the target location, the vehicle controller 250 and/or the flight control system 256 can select the aerial drop location based on the selected target location.

In additional or alternative examples, the vehicle controller 250 and/or the flight control system 256 can determine based on user input indicating the target location. For instance, in FIG. 2, the aerial vehicle 110 includes a user input/output device 264 for receiving the user input indicating the target location. As examples, the user input/output device 264 can include a mouse and keyboard, a joystick, a button panel, a touchscreen display, a dedicated display device, an audio speaker, and/or a voice recognition interface.

As shown in FIG. 2, the user input/output device 264 is in communication with the vehicle controller 250. In other examples, the user input/output device 264 can additionally or alternatively be in communication with the flight control system 256. In such examples, the power source 100 can include the user input/output device 264 and/or the user input/output device 264 can be separate from both the aerial vehicle 110 and the power source 100.

As noted above, when the aerial vehicle 110 jettisons the power source 100, the power source 100 is operable to fly to the target location. To fly the power source 100 to the target location, the flight control system 256 includes the processor and is configured to actuate the flight control surfaces 126. In FIG. 2, for example, the flight control surfaces 126 are coupled to one or more actuators 266, which are in communication with the flight control system 256 (e.g., via a wired and/or wireless communication link). As examples, the actuator(s) 266 can include one or more hydraulic devices, pneumatic devices, and/or electro-mechanic devices for moving the flight control surfaces 126 relative to the body 124. In this arrangement, the flight control system 256 can transmit one or more control signals to the actuator(s) 266 and, responsive to the control signal(s), the actuator(s) 266 can actuate to the flight control surfaces 126 to adjust the flight attitude of the power source 100.

As shown in FIG. 2, the flight control system 256 is also in communication with a navigation sensor 268. The navigation sensor 268 can determine a location of the power source 100, and provide an indication of the location of the power source 100 to the flight control system 256. For instance, the navigation sensor 268 can include a global positioning system (GPS) device, an inertial navigation system (INS), a vision system (e.g., including a camera and image analysis processor), and/or a laser guidance system. In one example, the location determined by the navigation sensor 268 can be defined by a set of coordinates including coordinates for a longitude, a latitude, and/or an altitude of the power source 100. In another example, the location determined by the navigation sensor 268 can be defined by a distance and/or a direction of the power source 100 relative to one or more reference points (e.g., the target location and/or one or more waypoints). Other examples are also possible.

The flight control system 256 can determine, using the navigation sensor 268, the location of the power source 100. The flight control system 256 can determine flight control data based on the determined location of the power source 100 and the target location. The flight control system 256 can then actuate, based on the flight control data, the flight control surfaces 126 to fly the power source 100 to the target location. By determining flight control data based on a location of the power source 100 and using the flight control data to actuate the flight control surfaces 126, the flight control system 256 can controllably and safely fly the power source 100 from the aerial vehicle 110 to the target location.

In one implementation, the navigation sensor 268 can be a GPS device in communication with the flight control system 256. The GPS device can determine a set of GPS coordinates of the power source 100, and provide the set of GPS coordinates of the power source 100 to the flight control system 256. The flight control system 256 can then determine the flight control data based on (i) the set of GPS coordinates of the power source 100 and (ii) a set of GPS coordinates of the target location. Responsive to determining the flight control data, the flight control system 256 can actuate the plurality of flight control surfaces 126 based on the flight control data to fly the power source 100 to the target location.

In some examples, the flight control system 256 can cause the power source 100 to directly fly in a direct route (e.g., along a straight line) from the aerial drop location to the target location. In some instances, this can provide the power source 100 with the shortest route to the target location, which can allow the power source 100 to reach the target location faster and more efficiently than other routes.

In other examples, the flight control system 256 can cause the power source 100 to fly a circuitous route from the aerial drop location to the target location. For instance, the flight control system 256 can cause the power source 100 to navigate around obstacles (e.g., trees, radio towers, mountains, windmills, and/or buildings) while flying from aerial drop location to the target location. Additionally, for instance, the flight control system 256 can cause the power source 100 to fly along a route, which reduces (or minimize) an extent of flying over heavily populated areas and/or avoids flying in restricted airspace. In further instances, when the power source 100 is jettisoned, the flight control system 256 can cause the power source 100 to fly back to the departure location from which the aerial vehicle 110 took off.

In some examples, the power source 100 can include an indicator system 270, which can facilitate making the power source 100 detectable to air traffic control and/or other aerial vehicles. For example, the indication system 270 can include a transponder, a retro-reflector, and/or a flashing light to indicate the location of the power source to air traffic control and/or other aerial vehicles. The indication system 270 can help to organize and expedite the flow of air traffic and provide information for pilots of other aerial vehicles near the power source 100.

In operation, the power source 100 can be releasably coupled to an aerial vehicle 110 by a releasable coupler 122, and the first electrical energy 240 can be supplied to the power source 100 to prepare for take-off of the aerial vehicle 110. Within examples, releasably coupling the power source 100 to the aerial vehicle 110 can include mechanically coupling the body 124 of the power source 100 to a station of the aerial vehicle 110 such that the power source 100 remains coupled to the aerial vehicle 110 until the aerial vehicle 110 jettisons the power source 100 (including, for example, during take-off and flight). Additionally, releasably coupling the power source 100 to the aerial vehicle 110 can include coupling the terminals 242 of power source 100 to the power supply system 246 of the aerial vehicle 110 so that the power source 100 can supply the first electrical energy 240 to the electric propulsion system 118 of the aerial vehicle 110.

After the power source 100 is coupled to the aerial vehicle 110 and charged with the first electrical energy 240, the aerial vehicle 110 can take-off from the departure location to commence a flight. During a first portion of the flight, the power source 100 can supply the first electrical energy 240 to the electric propulsion system 118 of the aerial vehicle 110. For example, the vehicle controller 250 and/or the flight control system 256 can control the power supply system 246 to cause the first electrical energy 240 to flow, via the terminals 242, from the energy storage device 138 to the electric propulsion system 118. The electric propulsion system 118 can use the first electrical energy 240 to generate thrust for flying from the departure location to the aerial drop location. As noted above, the aerial drop location can be less than a threshold distance of the target location, and the threshold distance can be related to a maximum distance of flight for the power source 100.

As noted above, the vehicle controller 250 and/or the flight control system 256 can determine the target location and/or the aerial drop location prior to take-off and/or after take-off. In either case, the vehicle controller 250 and/or the flight control system 256 can store the target location and/or the aerial drop location. Also, as described above, the vehicle controller 250 and/or the flight control system 256 can determine target location and/or the aerial drop location based on at least one factor from the group consisting of: an altitude of the power source 100, a glide ratio of the power source 100, a distance from the aerial drop location to the target location, an amount of electrical energy remaining in the energy storage device 138, and user input received from the user input/output device 264.

In some examples, the vehicle controller 250 and/or the flight control system 256 can determine when the aerial vehicle 110 and the power source 100 are at the aerial drop location. For example, in FIG. 2, the flight control system 256 can compare a location of the power source 100 determined by the navigation sensor 268 to the aerial drop location to determine when the power source 100 is at the aerial drop location. Although not shown in FIG. 2, the aerial vehicle 110 can include a navigation sensor in communication with the vehicle controller 250, and the vehicle controller 250 can determine when the aerial vehicle 110 and the power source 100 are at the aerial drop location based on the location determined by the navigation sensor of the aerial vehicle 110.

Responsive to flying the aerial vehicle 110 to the aerial drop location, the aerial vehicle 110 can jettison the power source 100. For example, responsive to the vehicle controller 250 and/or the flight control system 256 determining that the aerial vehicle 110 and/or the power source 100 are at the aerial drop location, the vehicle controller 250 and/or the flight control system 256 can actuate the releasable coupler 122 to jettison the power source 100 from the aerial vehicle 110. Within examples, jettisoning the power source 100 from the aerial vehicle 110 can include actuating the releasable coupler 122 from the first state to the second state, and/or decoupling the terminals 242 of the power source 100 from the power supply system 246.

Within examples, the flight control system 256 can determine that the power source 100 has been jettisoned from the aerial vehicle 110. For instance, the flight control system 256 can determine that the power source 100 has been jettisoned based on one or more signals from the navigation sensor 268, the vehicle controller 250, and/or the releasable coupler 122.

Responsive to the flight control system 256 determining that the power source 100 has been jettisoned, the flight control system 256 can actuate the flight control surfaces 126 and/or the propulsion system 139 of the power source 100 to fly the power source 100 to the target location. For instance, as described above, the flight control system 256 can (i) determine, using the navigation sensor 268, a location of the power source 100, (ii) determine flight control data based on the determined location of the power source 100 and the target location, and (iii) actuate, based on the flight control data, the flight control surfaces 126 and/or the propulsion system 139 to fly the power source 100 to the target location. In some examples, the flight control system 256 can iteratively perform these operations while flying the power source 100 to the target location. Additionally, within examples, the flight control system 256 can determine the flight control data by determining one or more waypoints between the aerial drop location and the target location, and actuating the flight control surfaces 126 and/or the propulsion system 139 to fly from waypoint to waypoint until the power source 100 reaches the target location.

When the power source 100 reaches the target location, the power source 100 can use the landing system 128 to land the power source 100 at the target location. In some examples, the target location can be the departure location such that landing the power source 100 at the target location includes landing the power source 100 at the departure location. In other examples, the target location can be a location that is within the threshold distance of the aerial drop location (i.e., within a maximum distance of flight for the power source 100).

At the target location, the power source 100 can be recovered and prepared for another flight. In some examples, after recovering the power source 100 at the target location, the power source 100 can be recharged and coupled to another aerial vehicle 110 at the target location. The operations described above can then be repeated for another flight with the power source 100 coupled to the other aerial vehicle 110.

In other examples, after recovering the power source 100 at the target location, the power source 100 can be transported from the target location to a recharging location. The power source 100 can then be recharged at the recharging location and coupled to another aerial vehicle 110. In one implementation, the power source 100 can be transported by another vehicle (e.g., a train, a truck, an airplane, etc.) to the recharging location. In another implementation, the power source 100 can transport itself to the recharging location. For instance, after recovering the power source 100 at the target location, the power source 100 can be recharged, take-off, and fly using the propulsion system 139 and the flight control surfaces 126 from the target location to the recharging location at which the power source 100 can be recharged again and coupled to another aerial vehicle 110.

Also, within examples, after the aerial vehicle 110 jettisons the power source 100, the aerial vehicle 110 can continue to fly to a destination location using the second electrical energy 248 stored in the power store(s) 120. Thus, the aerial vehicle 110 can use the first electrical energy 240 supplied by the power source 100 during a first portion of the flight, and the second electrical energy 248 supplied by the power store(s) 120 during a second portion of the flight. By jettisoning the power source 100 during the flight, the weight and drag on the aerial vehicle 110 is reduced, which extends the range and/or duration of flight for aerial vehicle 110.

Figure 3:
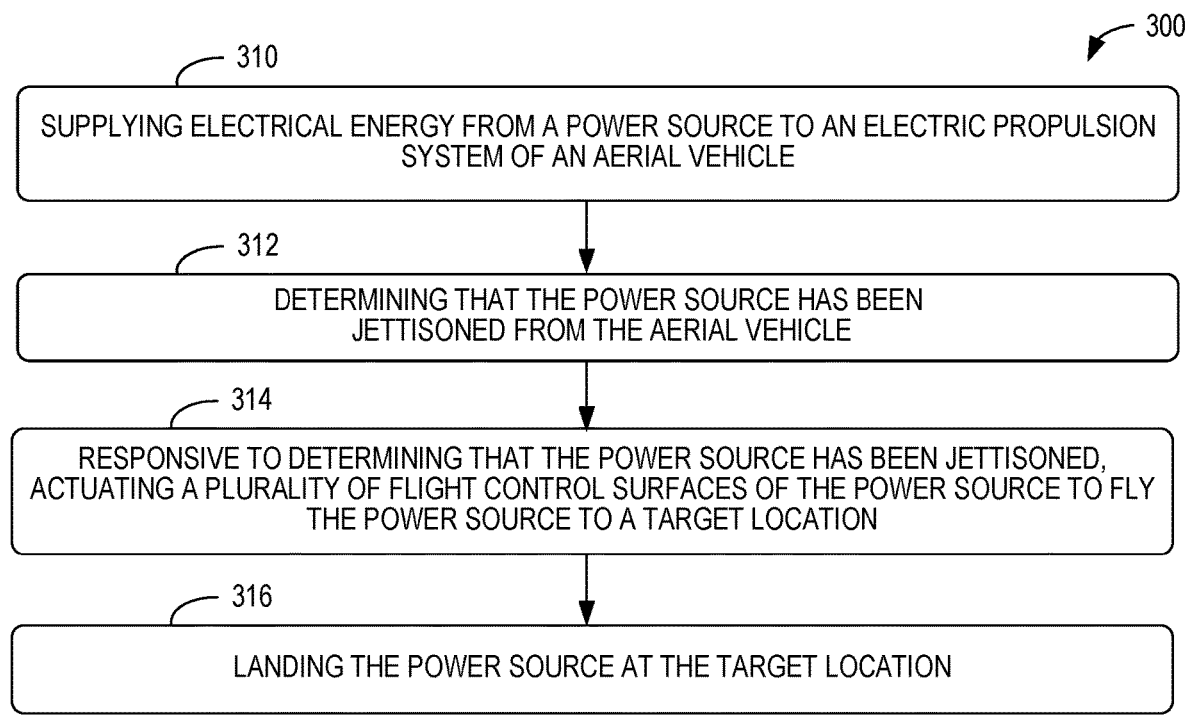
FIG. 3 illustrates a flow chart of an example process for operating a power source, according to an example embodiment.

Referring now to FIG. 3, a flowchart for a process 300 for operating a power source is illustrated according to an example embodiment. As shown in FIG. 3, at block 310, the process 300 includes supplying electrical energy from a power source to an electric propulsion system of an aerial vehicle. After supplying the electrical energy at block 310, the process 300 includes determining that the power source has been jettisoned from the aerial vehicle at block 312. Responsive to determining that the power source has been jettisoned at block 312, the process 300 includes actuating a plurality of flight control surfaces of the power source to fly the power source to a target location at block 314. At block 316, the process 300 includes landing the power source at the target location.

Figure 4:
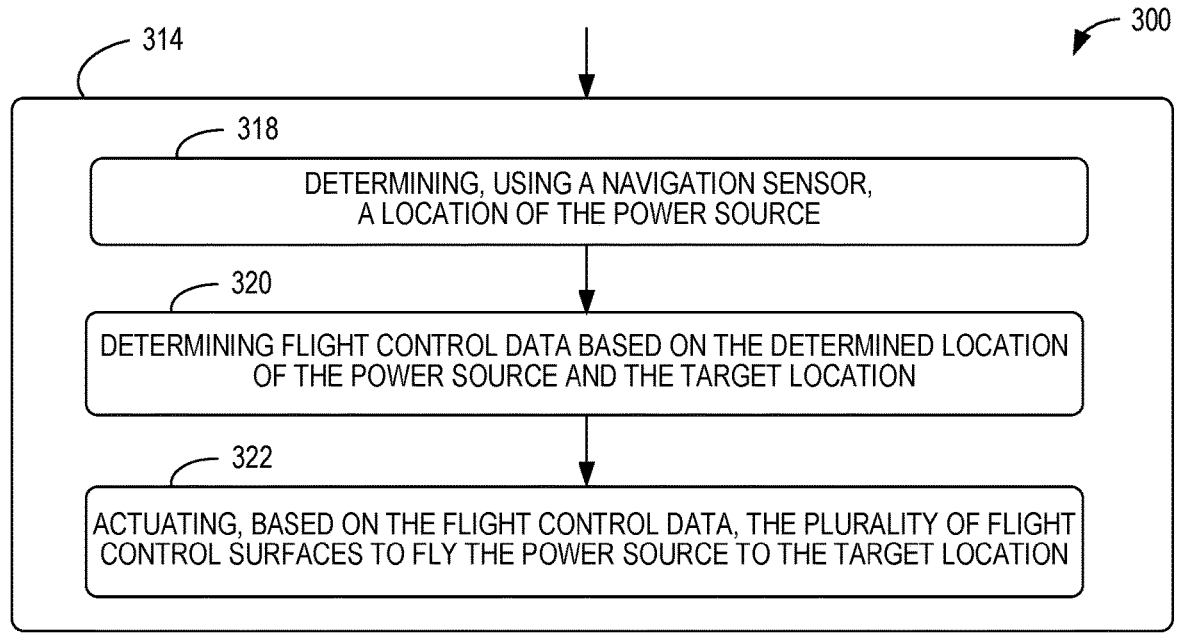
FIG. 4 illustrates a flow chart of an example process for operating a power source that can be used with the process shown in FIG. 3.
Figure 5:
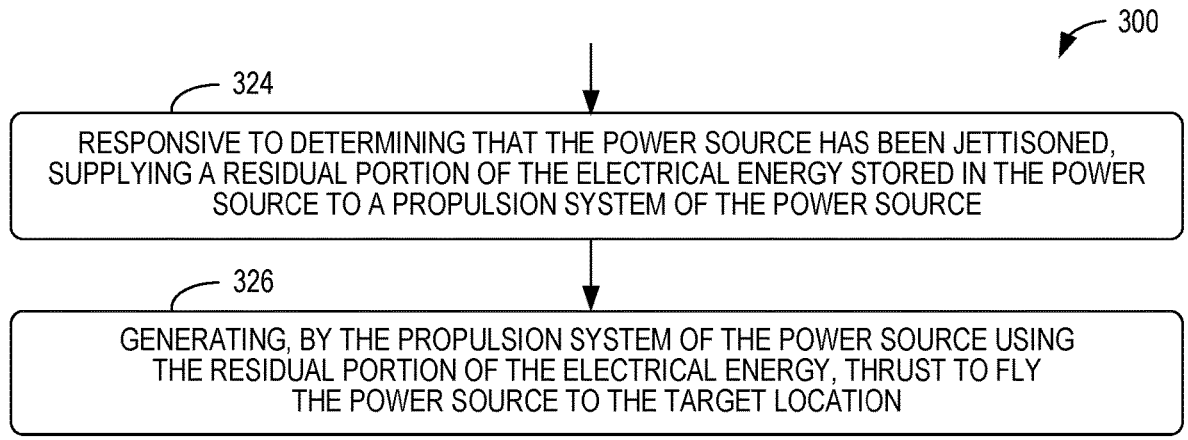
FIG. 5 illustrates a flow chart of an example process for operating a power source that can be used with the process shown in FIG. 3.
Figure 6:
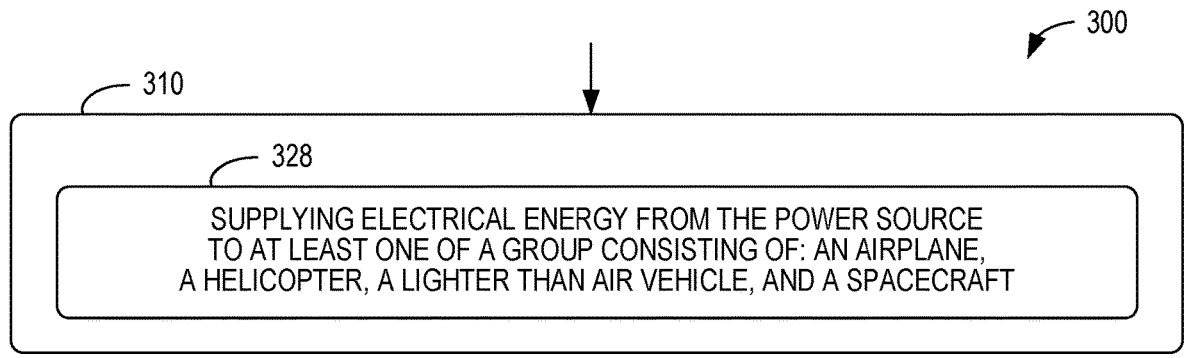
FIG. 6 illustrates a flow chart of an example process for operating a power source that can be used with the process shown in FIG. 3.

FIGS. 4-6 depict additional aspects of the process 300 according to further examples. As shown in FIG. 4, actuating the plurality of flight control surfaces of the drop tank to fly the drop tank to the target location at block 314 can include: (i) determining, using a navigation sensor, a location of the power source at block 318, (ii) determining flight control data based on the determined location of the power source and the target location at block 320, and (iii) and actuating, based on the flight control data, the plurality of flight control surfaces to fly the power source to the target location at block 322.

As shown in FIG. 5, the process 300 can also include, responsive to determining that the power source has been jettisoned at block 312, supplying a residual portion of the electrical energy stored in the power source to a propulsion system of the power source at block 324. At block 326, the process 300 can further include generating, by the propulsion system of the power source using the residual portion of the electrical energy, thrust to fly the power source to the target location.

As shown in FIG. 6, supplying the electrical energy from the power source to the electric propulsion system of the aerial vehicle at block 310 can include supplying electrical energy from the power source to at least one of a group consisting of: an airplane, a helicopter, a lighter-than-air vehicle, and a spacecraft at block 328.

Figure 7:
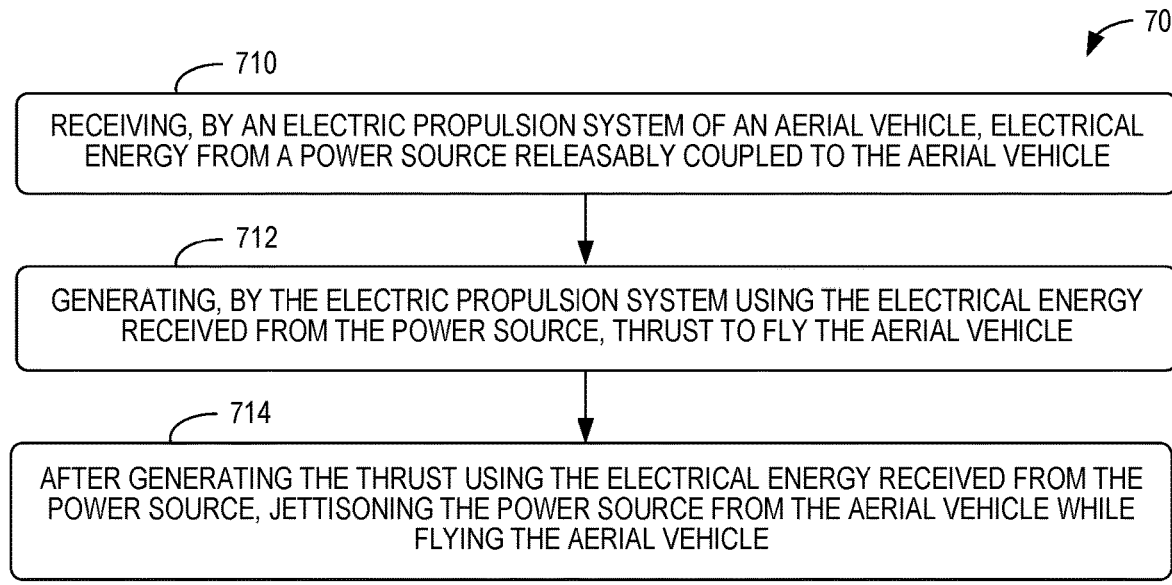
FIG. 7 illustrates a flow chart of an example process according to an example embodiment.

FIG. 7 depicts a flowchart for a process 700 according to another example embodiment. As shown in FIG. 7, the process 700 includes receiving, by an electric propulsion system of an aerial vehicle, electrical energy from a power source releasably coupled to the aerial vehicle at block 710. At block 712, the process 700 includes generating, by the electric propulsion system using the electrical energy received from the power source, thrust to fly the aerial vehicle. After generating the thrust using the electrical energy received from the power source at block 712, the process 700 includes jettisoning the power source from the aerial vehicle while flying the aerial vehicle at block 714.

Figure 8:
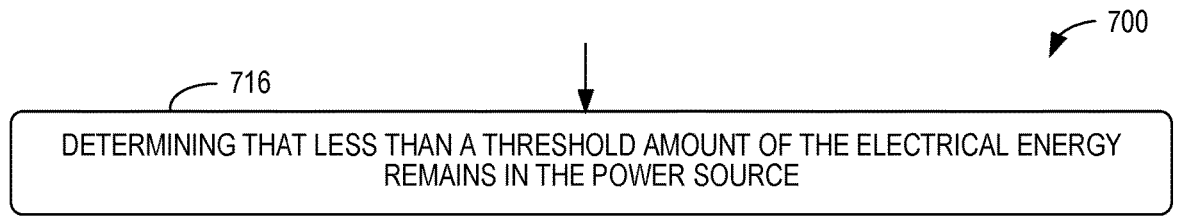
FIG. 8 illustrates a flow chart of an example process that can be used with the process shown in FIG. 7.
Figure 9:
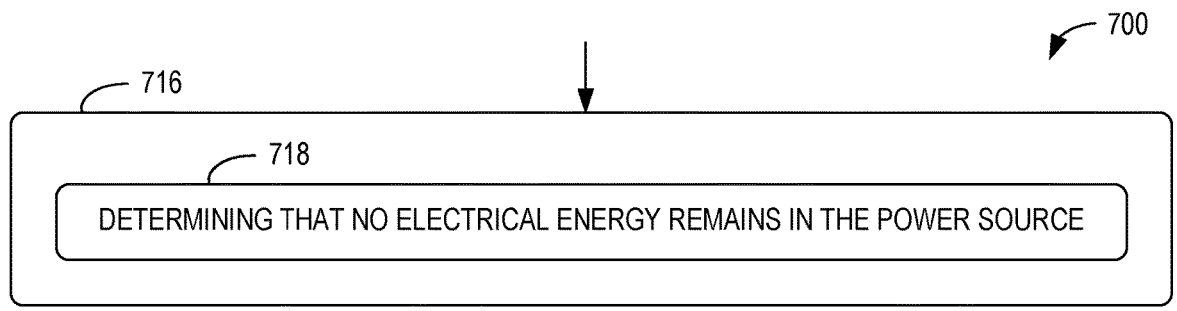
FIG. 9 illustrates a flow chart of an example process that can be used with the process shown in FIG. 7.

FIGS. 8-13 depict additional aspects of the process 700 according to further examples. As shown in FIG. 8, the process 700 further includes determining that less than a threshold amount of the electrical energy remains in the power source at block 716. In the example shown in FIG. 8, jettisoning the power source from the aerial vehicle while flying the aerial vehicle at block 714 can be responsive to determining that less than the threshold amount of the electrical energy remains in the power source at block 716. As shown in FIG. 9, determining that less than the threshold amount of electrical energy remains in the power source at block 716 can include determining that no electrical energy remains in the power source at block 718.

Figure 10:
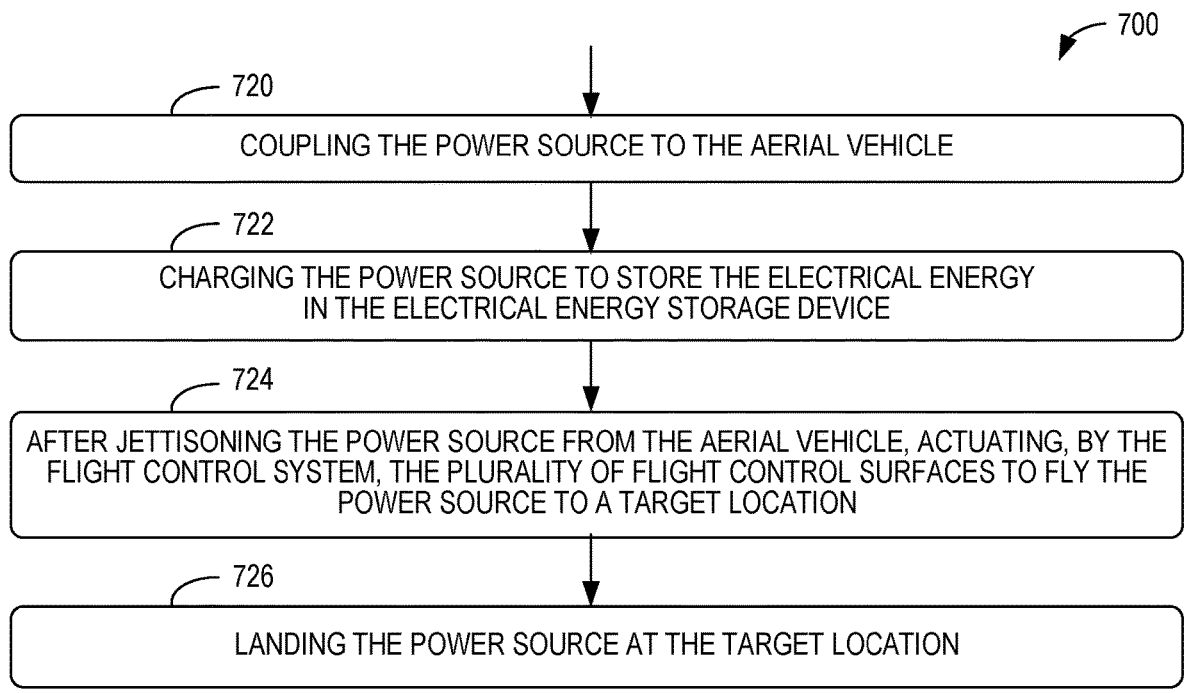
FIG. 10 illustrates a flow chart of an example process that can be used with the process shown in FIG. 9.

As shown in FIG. 10, the process 700 can also include coupling the power source to the aerial vehicle at block 720. The power source can include a body having an electrical energy storage device, and a plurality of flight control surfaces extending outwardly from the body. The plurality of flight control surfaces are actuatable to adjust a flight attitude of the power source. The power source can also include a flight control system including a processor and configured to actuate the plurality of flight control surfaces.

At block 722, the process 700 can include charging the power source to store the electrical energy in the electrical energy storage device. After jettisoning the power source from the aerial vehicle at block 714, the process 700 can include actuating, by the flight control system, the plurality of flight control surfaces to fly the power source to a target location at block 724. At block 726, the process 700 can include landing the power source at the target location.

Figure 11:
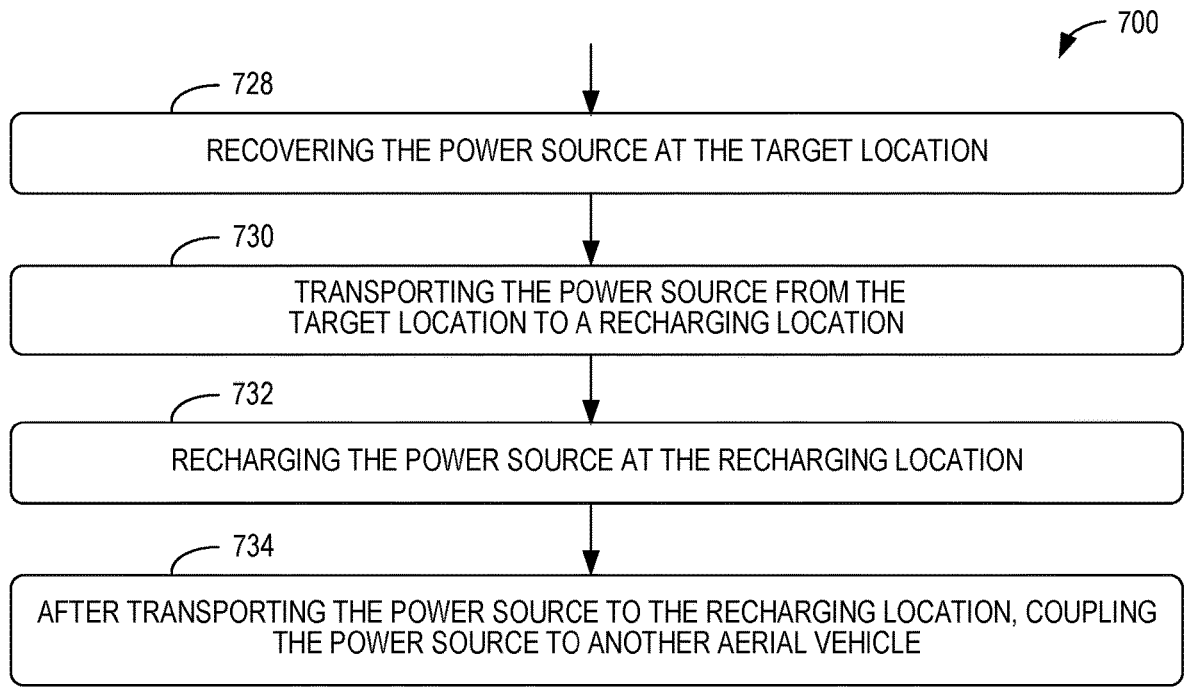
FIG. 11 illustrates a flow chart of an example process that can be used with the process shown in FIG. 7.

As shown in FIG. 11, the process 700 can further include recovering the power source at the target location at block 728, transporting the power source from the target location to a recharging location at block 730, and recharging the power source at the recharging location at block 732. After transporting the power source to the recharging location at block 730, the process 700 can include coupling the power source to another aerial vehicle at block 734.

Figure 12:
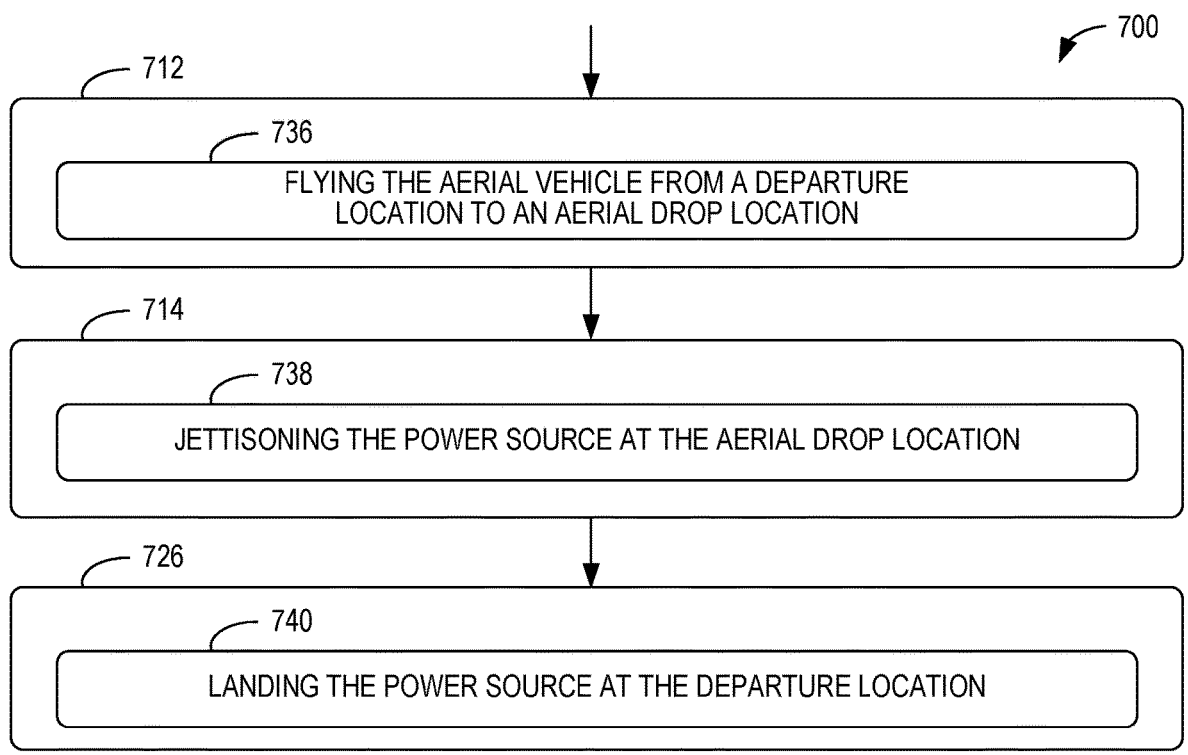
FIG. 12 illustrates a flow chart of an example process that can be used with the process shown in FIG. 7.

As shown in FIG. 12, generating thrust at block 712 can include flying the aerial vehicle from a departure location to an aerial drop location at block 736, jettisoning the power source from the aerial vehicle at block 714 can include jettisoning the power source at the aerial drop location at block 738, and landing the power source at the target location at block 726 can include landing the power source at the departure location at block 740.

Figure 13:
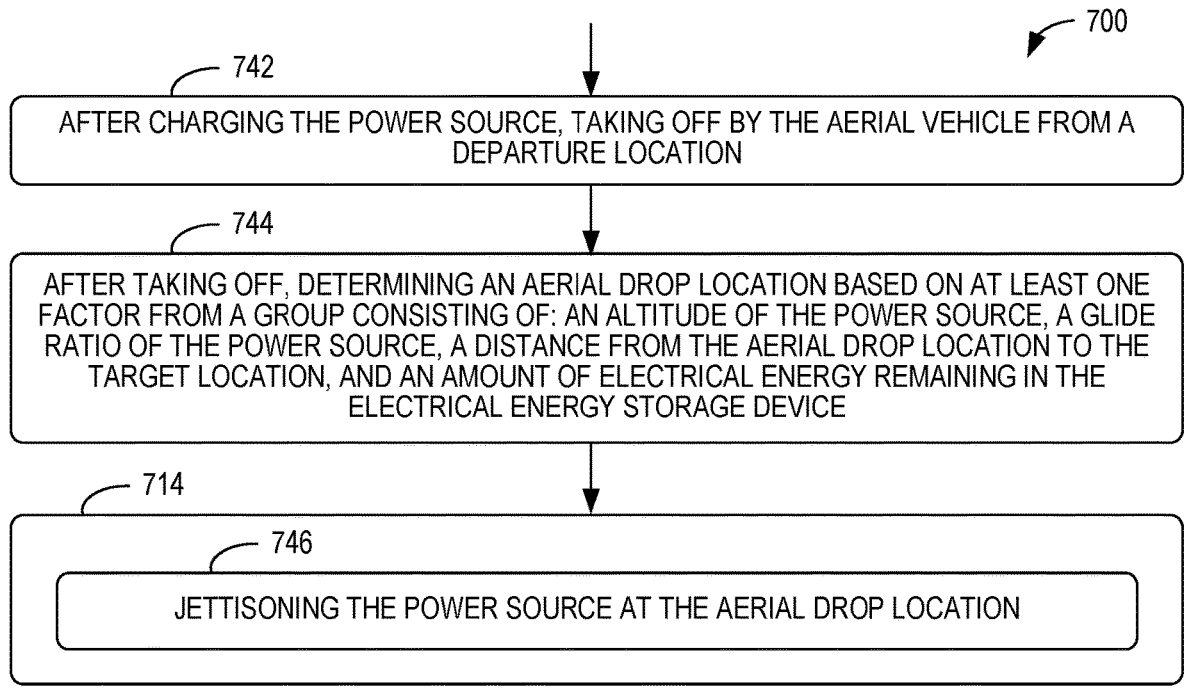
FIG. 13 illustrates a flow chart of an example process that can be used with the process shown in FIG. 7.

As shown in FIG. 13, after charging the power source at block 722, the process 700 can include taking off by the aerial vehicle from a departure location at block 742. After taking off at block 742, the process 700 can include determining at block 744 an aerial drop location based on at least one factor from a group consisting of: an altitude of the power source, a glide ratio of the power source, a distance from the aerial drop location to the target location, and an amount of electrical energy remaining in the electrical energy storage device. Also, as shown in FIG. 13, jettisoning the power source from the aerial vehicle at block 714 can include jettisoning the power source at the aerial drop location at block 746.

Any of the blocks shown in FIGS. 3-13 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A power source for an electric propulsion system of an aerial vehicle, comprising:
   a body having an electrical energy storage device configured to store electrical energy;
   a plurality of terminals coupled to the electrical energy storage device for supplying the electrical energy from the electrical energy storage device to the electric propulsion system of the aerial vehicle;
   a plurality of flight control surfaces extending outwardly from the body, wherein the flight control surfaces are actuatable to adjust a flight attitude of the power source; and
   a flight control system including a processor and configured to:
      receive an energy-level signal from a power sensor operatively coupled to the electrical energy storage device, wherein the energy-level signal is indicative of an amount of electrical energy that remains in the electrical energy storage device,
      determine, based on the energy-level signal, that less than a threshold amount of electrical energy remains in the electrical energy storage device,
      responsive to a determination that less than the threshold amount of electrical energy remains in the electrical energy storage device, select a target location from among a plurality of candidate locations, and
      actuate the plurality of flight control surfaces to fly the power source to the target location when the power source is jettisoned from the aerial vehicle.

2. The power source of claim 1, wherein the electrical energy storage device comprises at least one of a group consisting of: a battery, a supercapacitor, and a fuel cell.

3. The power source of claim 1, wherein the plurality of flight control surfaces comprises at least one of a group consisting of: an elevator, a rudder, an aileron, a flap, a spoiler, a leading edge flap, a leading edge slat, and a parafoil.

4. The power source of claim 3, wherein the body comprises at least one of a group consisting of: a wing, a horizontal stabilizer, and a vertical stabilizer.

5. The power source of claim 1, further comprising a landing system for landing the power source at the target location,
   wherein the landing system comprises at least one of a group consisting of: a wheel, a ski, a pontoon, a rotor, and a parachute.

6. The power source of claim 1, further comprising a global positioning system (GPS) device in communication with the flight control system,
   wherein the GPS device is configured to determine a set of GPS coordinates of the power source,
   wherein flight control system is configured to determine flight control data based on (i) the set of GPS coordinates of the power source and (ii) a set of GPS coordinates of the target location, and
   wherein the flight control system is configured to actuate the plurality of flight control surfaces based on the flight control data.

7. The power source of claim 1, further comprising a propulsion system configured to use a residual portion of the electrical energy, which remains in the electrical energy storage device after the aerial vehicle jettisons the power source, to provide thrust for flying the power source to the target location,
   wherein the flight control system is configured to control the propulsion system.

8. The power source of claim 1, wherein the flight control system is configured to determine an aerial drop location, at which the power source is to be jettisoned from the aerial vehicle, based on at least one factor selected from a group consisting of: an altitude of the power source, a glide ratio of the power source, and a distance from the aerial drop location to the target location.

9. The power source of claim 8, wherein the flight control system is further configured to determine the aerial drop location based on an amount of the electrical energy remaining in the electrical energy storage device.

10. A method comprising:
supplying electrical energy from a power source to an electric propulsion system of an aerial vehicle;
receiving an energy-level signal from a power sensor operatively coupled to the power source, wherein the energy-level signal is indicative of an amount of electrical energy that remains in the power source;
determining, based on the energy-level signal, that less than a threshold amount of electrical energy remains in the power source;
responsive to determining that less than the threshold amount of electrical energy remains in the power source, selecting a target location from among a plurality of candidate locations;
after supplying the electrical energy, determining that the power source has been jettisoned from the aerial vehicle;
responsive to determining that the power source has been jettisoned, actuating a plurality of flight control surfaces of the power source to fly the power source to the target location; and
landing the power source at the target location.

11. The method of claim 10, wherein actuating the plurality of flight control surfaces of the power source to fly the power source to the target location comprises:
determining, using a navigation sensor, a location of the power source;
determining flight control data based on the determined location of the power source and the target location; and
actuating, based on the flight control data, the plurality of flight control surfaces to fly the power source to the target location.

12. The method of claim 10, further comprising:
responsive to determining that the power source has been jettisoned, supplying a residual portion of the electrical energy stored in the power source to a propulsion system of the power source; and
generating, by the propulsion system of the power source using the residual portion of the electrical energy, thrust to fly the power source to the target location.

13. The method of claim 10, wherein supplying the electrical energy from the power source to the electric propulsion system of the aerial vehicle comprises supplying electrical energy from the power source to at least one of a group consisting of: an airplane, a helicopter, a lighter-than-air vehicle, and a spacecraft.

14. A method comprising:
receiving, by an electric propulsion system of an aerial vehicle, electrical energy from a power source releasably coupled to the aerial vehicle;
generating, by the electric propulsion system using the electrical energy received from the power source, thrust to fly the aerial vehicle;
after generating the thrust using the electrical energy received from the power source, selecting a target location from among a plurality of candidate locations;

after selecting the target location, determining an aerial drop location based on (i) an altitude of the power source, (ii) a glide ratio of the power source, and (iii) a distance from the aerial drop location to the target location; and
after selecting the target location and selecting the aerial drop location, jettisoning the power source from the aerial drop location to the target location while flying the aerial vehicle.

15. The method of claim 14, further comprising determining that less than a threshold amount of the electrical energy remains in the power source,
wherein jettisoning the power source from the aerial vehicle while flying the aerial vehicle is responsive to determining that less than the threshold amount of the electrical energy remains in the power source.

16. The method of claim 15, wherein determining that less than the threshold amount of the electrical energy remains in the power source comprises determining that no electrical energy remains in the power source.

17. The method of claim 14, further comprising:
coupling the power source to the aerial vehicle, wherein the power source comprises:
a body having an electrical energy storage device,
a plurality of flight control surfaces extending outwardly from the body, wherein the plurality of flight control surfaces are actuatable to adjust a flight attitude of the power source, and
a flight control system including a processor and configured to actuate the plurality of flight control surfaces;
charging the power source to store the electrical energy in the electrical energy storage device;
after jettisoning the power source from the aerial vehicle, actuating, by the flight control system, the plurality of flight control surfaces to fly the power source to a target location; and
landing the power source at the target location.

18. The method of claim 17, further comprising:
recovering the power source at the target location;
transporting the power source from the target location to a recharging location;
recharging the power source at the recharging location; and
after transporting the power source to the recharging location, coupling the power source to another aerial vehicle.

19. The method of claim 17, wherein generating thrust comprises flying the aerial vehicle from a departure location to an aerial drop location,
wherein jettisoning the power source from the aerial vehicle comprises jettisoning the power source at the aerial drop location, and
wherein landing the power source at the target location comprises landing the power source at the departure location.

20. The method of claim 17, further comprising:
after charging the power source, taking off by the aerial vehicle from a departure location,
wherein determining the aerial drop location is further based on an amount of electrical energy remaining in the electrical energy storage device.

* * * * *